United States Patent [19]
Dunn

[11] 3,872,628
[45] Mar. 25, 1975

[54] DISC GRINDING MACHINE
[75] Inventor: Elman R. Dunn, Roscoe, Ill.
[73] Assignee: Litton Industries, Inc., Beverly Hills, Calif.
[22] Filed: Dec. 3, 1973
[21] Appl. No.: 421,221

[52] U.S. Cl. ............................. 51/215 HM, 51/134
[51] Int. Cl. ........................ B24b 7/00, B24b 47/20
[58] Field of Search .... 51/215 R, 215 AR, 215 HM, 51/215 E, 215 M, 112, 117, 118, 134, 215 SF

[56] References Cited
UNITED STATES PATENTS

| 993,981 | 5/1911 | Grover | 51/215 HM |
|---|---|---|---|
| 2,067,566 | 1/1937 | Field | 51/215 HM |
| 2,253,324 | 8/1941 | Cramer | 51/215 AR X |
| 2,795,090 | 6/1957 | Sterna | 51/118 X |
| 3,750,346 | 8/1973 | Beauregard | 51/134 |
| R5,228 | 1/1873 | Warth | 51/215 HM |

Primary Examiner—Donald G. Kelly
Attorney, Agent, or Firm—Spencer T. Smith

[57] ABSTRACT

A disc grinding machine including a rotary work carrier having a plurality of work holding stations for receiving workpieces from a conveyor or the like. The workpieces are displaced through a grinding zone whereby at least one face of each workpiece will be ground to size. Locator elements are selectively located so that when a workpiece is positioned within one of the work holding stations and axially displaced towards the locator, the workpiece will abut thereagainst thereby becoming properly axially located. The axially located workpieces are clamped in position and are then displaced through the grinding zone. Elements are provided for conjointly displacing a workpiece located within a work holding station incrementally axially towards and into forceful engagement with the locator and urging the workpiece downwardly against the work holding station at least until the axially located workpiece is clamped in the axially located position.

8 Claims, 3 Drawing Figures

Fig_1
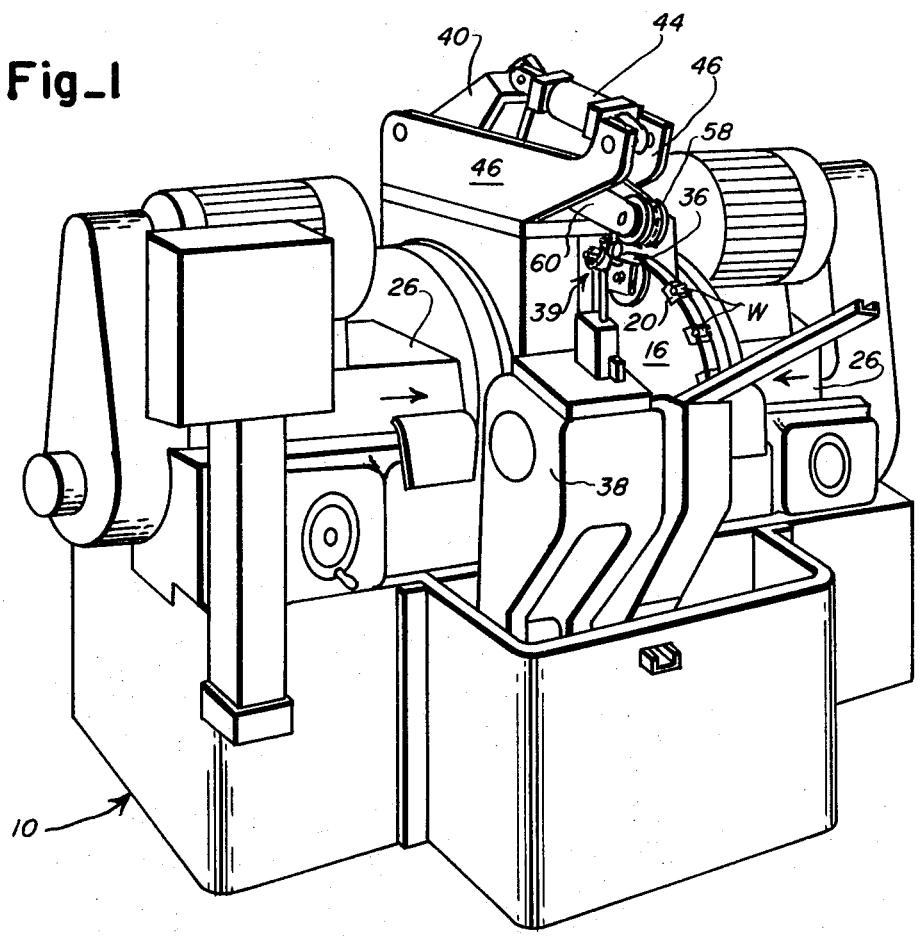
Fig_2
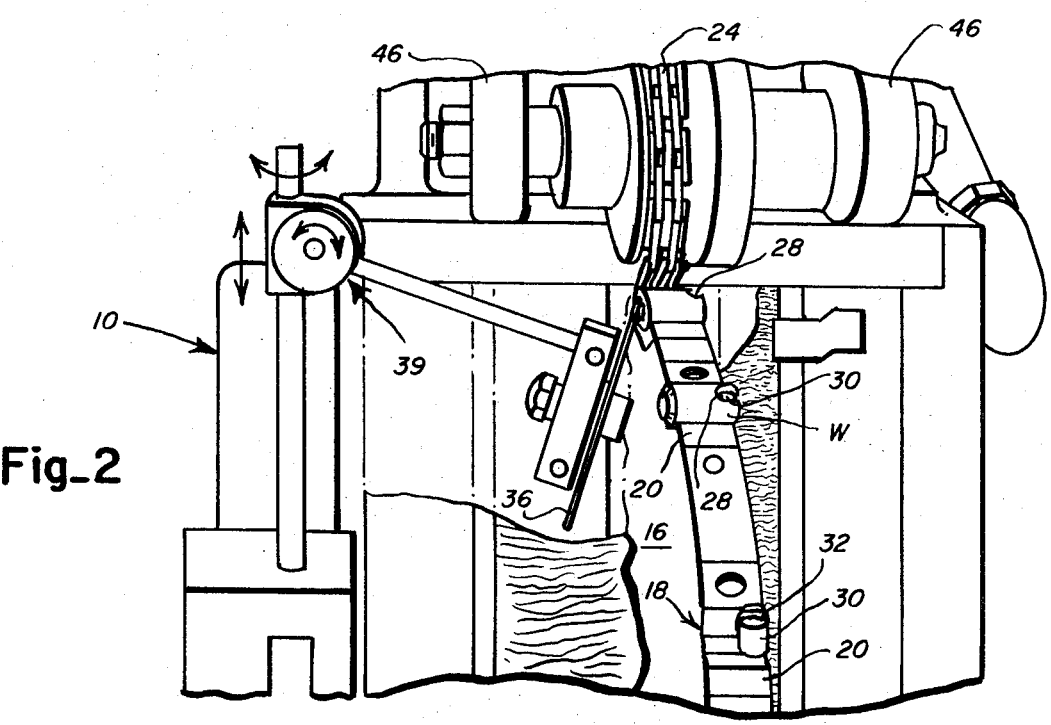

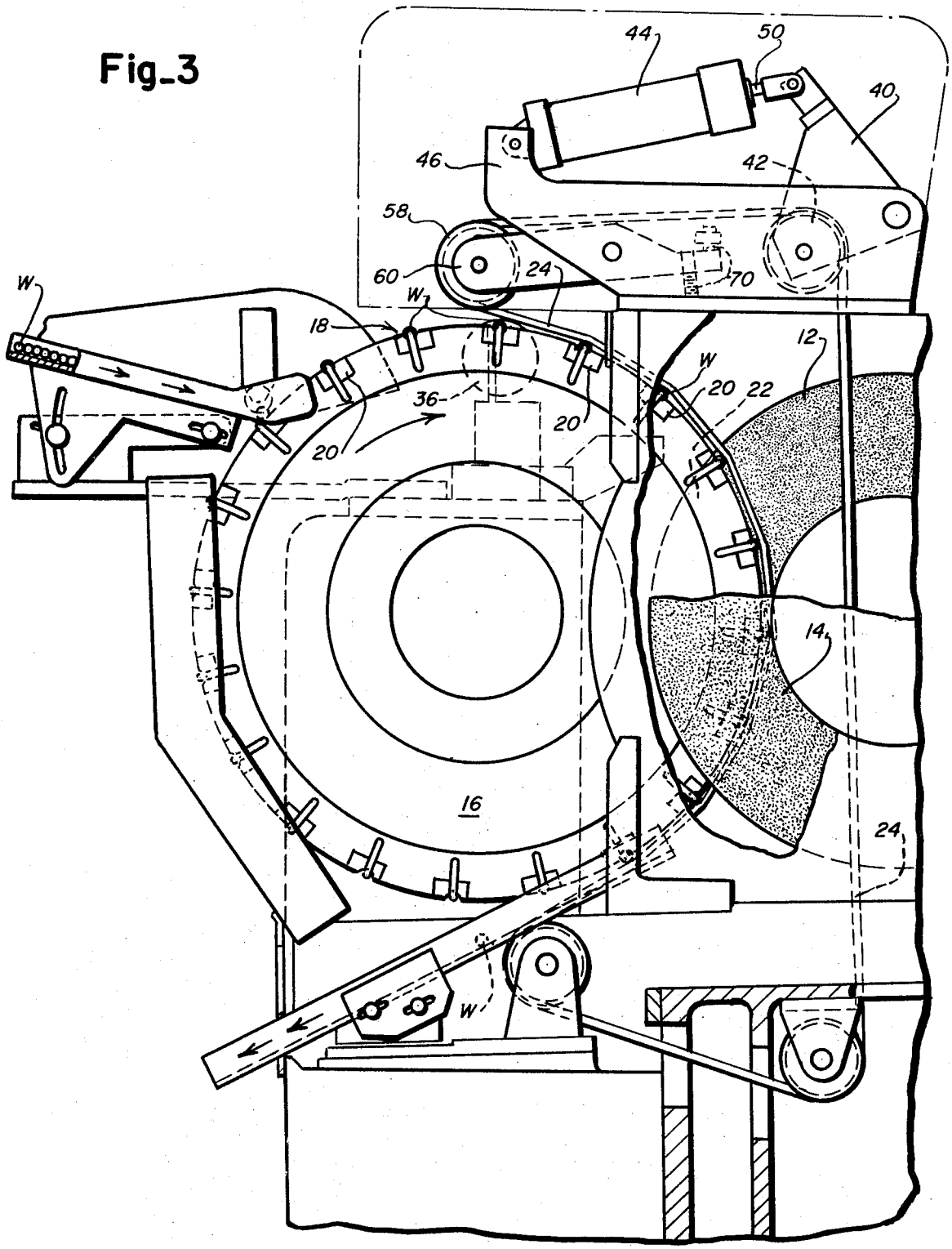
Fig_3

DISC GRINDING MACHINE

This invention relates to locator assemblies for properly locating workpieces in work holding stations of a rotary work carrier of a disc grinding machine.

In order to meet production requirements, work feeding mechanisms are normally utilized to feed workpieces successively into angularly spaced slots or work holding stations in the periphery of a rotary work carrier which carries the workpieces in a continuous path between a pair of abrasive discs whereby the opposite faces of the workpieces are ground parallel. A closed loop hold-down chain is utilized in a conventional manner to clamp the workpieces within the work holding stations as they are advanced through the grinding zone.

Extremely light workpieces tend to become angularly offset or skew within the work holding stations as a result of the frictional engagement of the workpieces with a locating surface such as a spring loaded taper shoe of a locator assembly which locates the workpiece axially within the work holding station and this results in the faulty location of the workpieces.

It is, accordingly, an object of the present invention to provide a locating assembly which will conjointly maintain a workpiece within a work holding station while locating the workpiece at a precise axial location so that the workpiece will not be disoriented during the locating operation thereby assuring precise location of the workpiece.

Among the advantages of the present invention is the provision of a grinding machine having a rotary work carrier wherein at least one face of a light workpiece can be ground to and extremely close tolerance.

Another advantage of the present invention is the provision of a locator mechanism which is inexpensive and simple to replace and which can readily be modified to accommodate a workpiece having a different configuration.

Other objects and advantages of the present invention will become apparent from the following portion of this specification and from the accompanying drawings which illustrate in accordance with the mandate of the patent statutes, a presently preferred embodiment incorporating the principles of the invention.

Referring to the drawings:

FIG. 1 is a front oblique view of a horizontal double disc grinder constructed in accordance with the teachings of the present invention;

FIG. 2 is an enlarged view partially broken away of the horizontal double disc grinder illustrated in FIG. 1, and FIG. 3 is an elevational view of the horizontal double disc grinder illustrated in FIG. 1 taken from the right-hand side and partially broken away.

The basic components of a horizontal double disc grinding machine 10 are illustrated in FIGS. 1, 2 and 3. The double disc grinding machine 10 includes left-hand and right-hand abrasive discs 12 and 14 each including a central axially extending bore. Workpieces W are advanced between the discs 12 and 14 by a rotary work carrier 16, having a plurality of work holding stations 18 equally spaced about its periphery, which is rotatively driven by a work carrier drive motor. The work holding stations 18 each include a V-block 20 for receiving the workpieces and for establishing a desired relationship between the axis of the workpiece and the axis of the rotary carrier. The workpieces W are clamped in the V-blocks 20 after they have been properly axially located by a hold-down chain 24 which is driven by the rotary work carrier 16 through frictional engagement of the chain 24 with the rotary carrier via the clamped workpieces W and are then fed through the grinding zone 22 (FIG. 3).

The abrasive discs 12 and 14 are conventionally rotatably mounted on a pair of slides 26 which are longitudinally displaceable along a machine bed, to establish a desired separation or gap between the discs. Incremental infeed is provided to advance the discs to compensate for wheel wear from the cutting face of the discs and to periodically restore the desired separation between the abrasive discs.

The workpieces W each include an arcuate surface 28 which, when a workpiece is properly axially located within the V-block 20 of a work holding station, engages with a solid stop of a locator assembly in the form of a locating finger 30 having a locator sphere or ball 32 of wear resistant metal. These locating fingers 30 are secured to the rotary work carrier 16 at each of the work holding stations 20. It is understood that different workpiece configurations naturally would require a different style of locator stop member. The locator assembly additionally includes a freewheeling canted rotatable disc 36 of spring steel which is fixedly mounted to the carrier housing 38 by means of a universal clamp 39.

In operation, a plurality of workpieces are fed or placed individually into successive work holding stations. As the rotary work carrier is rotated in the clockwise direction, one end of each workpiece engages the freewheeling rotatable disc 36, and due to the compound angular orientation of the disc and its location in the path of the one end of the workpiece, the workpiece is axially displaced gradually towards the locating finger. At the same time the tilted freewheeling disc rotates and exerts a downwardly directed force on the workpiece thereby restraining the workpiece from becoming skewed or axially disoriented within the work holding station.

Since the rotatable disc is positioned so that the separation intermediate the rotable disc and the rotary work carrier would continue to decrease but for the presence of the axially located workpiece, once the workpiece is axially located and thereby can no longer be axially displaced, the spring steel freewheeling disc is gradually deflected away from its normal position and thereby exerts a force which continually increases as the freewheeling disc rotates and is further deflected, imposing both axial and radial (relative to the rotary work carrier) force components upon the workpiece. The workpiece will, accordingly, be effectively retained axially against the locator finger and downwardly within the V-block in the desired axial orientation until the workpiece is clamped by the hold-down chain.

The freewheeling disc 36 is perferably set at a compound angle relative to the axis of the rotary work carrier by not only tilting the disc from top to bottom, but by additionally canting the rotatable disc from back to front whereby the peripheral distance during which location and clamping must occur can be substantially increased.

The freewheeling disc 36 should be of sufficient thickness to withstand wear from normal operation and flexible enough to prevent excessive forces from interfering with the rotation and axial stability of the rotary work carrier 20.

The freewheeling disc 36 is mounted on the carrier housing 38 in an axially (relative to the axis of the rotary work carrier) spaced relation to the hold-down chain 26 to permit the freewheeling disc to forcefully retain the workpiece in the desired axially located position until the hold-down chain provides a sufficient radial force against the workpiece to clamp the workpiece in position to prevent subsequent movement of the workpiece within the work holding station.

The force applied radially downwardly by the hold-down chain 24 may be selectively controlled by adjusting the tension of the hold-down chain 24. Outward displacement of the pneumatic cylinder 44 rod member 50 results in the clockwise displacement of the idler pulley arm 40 and the idler pulley 42 which is secured thereto thereby increasing the hold-down chain tension.

The position relative to the rotary work carrier of the idler pulley 58 which is rotatably supported by a pivot arm 60 pivotably mounted to the bracket 46, may be varied by adjusting positioning screws 70 to properly establish the precise peripheral location at which the hold-down clamp will engage and clamp the axially located workpieces. The radial force of the hold-down chain 26 must be of sufficient force to restrain workpieces against rotation as they are traversed through the abrasive zone.

The orientation and location of the freewheeling disc 36 can be changed so that the radial and axial components of the force applied to the workpiece can be selectively varied as desired.

Having thus disclosed my invention, what I claim is:

1. A disc grinding machine comprising a rotary work carrier, mounted for rotation about a selected axis of rotation, including a plurality of work holding stations for receiving workpieces from a conveyor or the like and for feeding the received workpieces through a grinding zone whereby at least one face of the received workpieces will be ground to size, locator means selectively located so that when a workpiece is received in one of said workholding stations and axially displaced in a selected direction the received workpiece will abut against said locator means thereby becoming properly axially located, and means for conjointly displacing a received workpiece incrementally axially towards and into forceful engagement with said locator means and urging the received workpiece radially inwardly towards said axis of rotation against the work holding station.

2. A disc grinding machine according to claim 1, wherein said locator means comprises a plurality of locator fingers secured to a corresponding plurality of work holding stations.

3. A disc grinding machine according to claim 1, wherein said conjointingly displacing and urging means comprises a freewheeling flexible disc selectively tilted from top to bottom relative to said rotary work carrier.

4. A disc grinding machine according to claim 3, wherein said freewheeling disc is selectively canted from back to front.

5. A disc grinding machine according to claim 4, further comprising means for selectively varying the degree of tilt.

6. A disc grinding machine according to claim 5, further comprising means for selectively varying the degree of cant.

7. A disc grinding machine according to claim 6, further comprising means for varying the axial location of said freewheeling disc.

8. A disc grinding machine according to claim 1 further comprising means for clamping the axially located workpieces at their axially located positions while the axially located workpieces are urged against the work holding stations.

* * * * *